United States Patent [19]

Bosio

[11] Patent Number: 5,329,958
[45] Date of Patent: Jul. 19, 1994

[54] SINGLE-CONTROL MIXER CARTRIDGE FOR HOT AND COLD WATER

[75] Inventor: Orlando Bosio, Casaloldo, Italy

[73] Assignee: AMFAG S.r.l., Castelgoffredo, Italy

[21] Appl. No.: 53,274

[22] Filed: Apr. 28, 1993

[30] Foreign Application Priority Data

Apr. 30, 1992 [IT]  Italy .................. MN92A000010

[51] Int. Cl.⁵ ......................................... F16K 11/074
[52] U.S. Cl. ............................... 137/269; 137/625.17; 137/625.4; 251/355
[58] Field of Search ................ 137/269, 625.17, 625.4, 137/625.41, 636.3; 251/355

[56] References Cited

U.S. PATENT DOCUMENTS

| | | | |
|---|---|---|---|
| 3,938,546 | 2/1976 | Farrell | 137/454.2 |
| 4,621,659 | 11/1986 | Pawelzik | 137/625.17 |
| 4,804,011 | 2/1989 | Knapp | 137/625.4 X |
| 4,856,556 | 8/1989 | Mennigmann | 137/625.4 |
| 4,971,113 | 11/1990 | Pawelzik et al. | 137/625.17 |
| 4,995,419 | 2/1991 | Pawelzik et al. | 137/625.17 X |
| 4,997,005 | 3/1991 | Pawelzik et al. | 137/625.17 |
| 5,080,134 | 1/1992 | Orlandi | 137/625.17 |
| 5,111,842 | 5/1992 | Knapp | 137/625.17 X |

FOREIGN PATENT DOCUMENTS

| | | |
|---|---|---|
| 0304529 | 3/1989 | European Pat. Off. . |
| 3239924 | 5/1984 | Fed. Rep. of Germany . |
| 3619499 | 12/1986 | Fed. Rep. of Germany . |
| 9101627 | 5/1991 | Fed. Rep. of Germany . |

*Primary Examiner*—John Rivell
*Attorney, Agent, or Firm*—Guido Modiano; Albert Josif; Daniel O'Byrne

[57] ABSTRACT

Single-control mixer cartridge for hot and cold water, comprising a body which is associated with a bottom for containing a fixed plate and a movable plate provided with a plate cover which is coupled to an actuation lever pivoted on a rotating coupling; characterized in that the bottom is provided with elements for the stable engagement of a supplemental bottom.

23 Claims, 6 Drawing Sheets

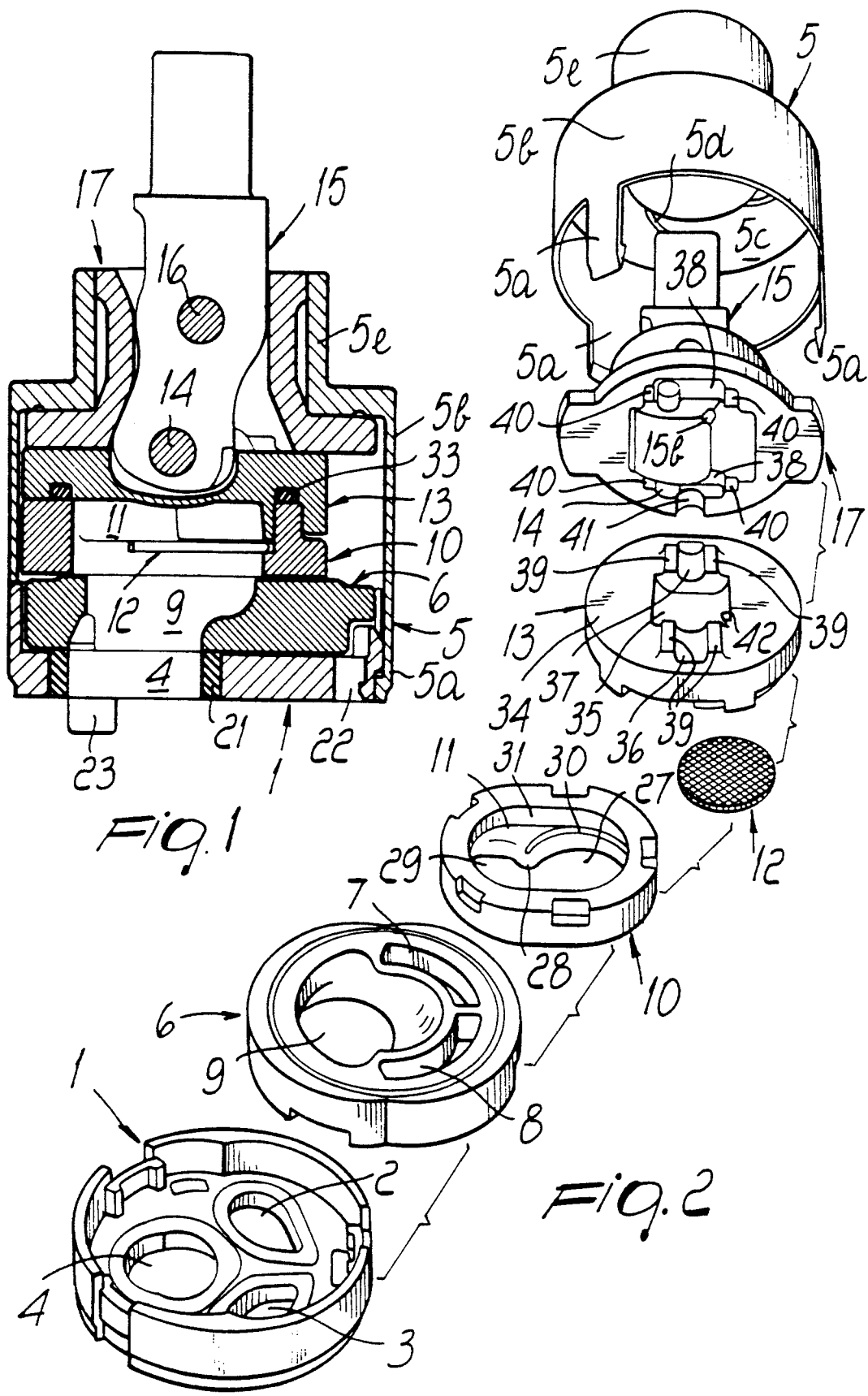

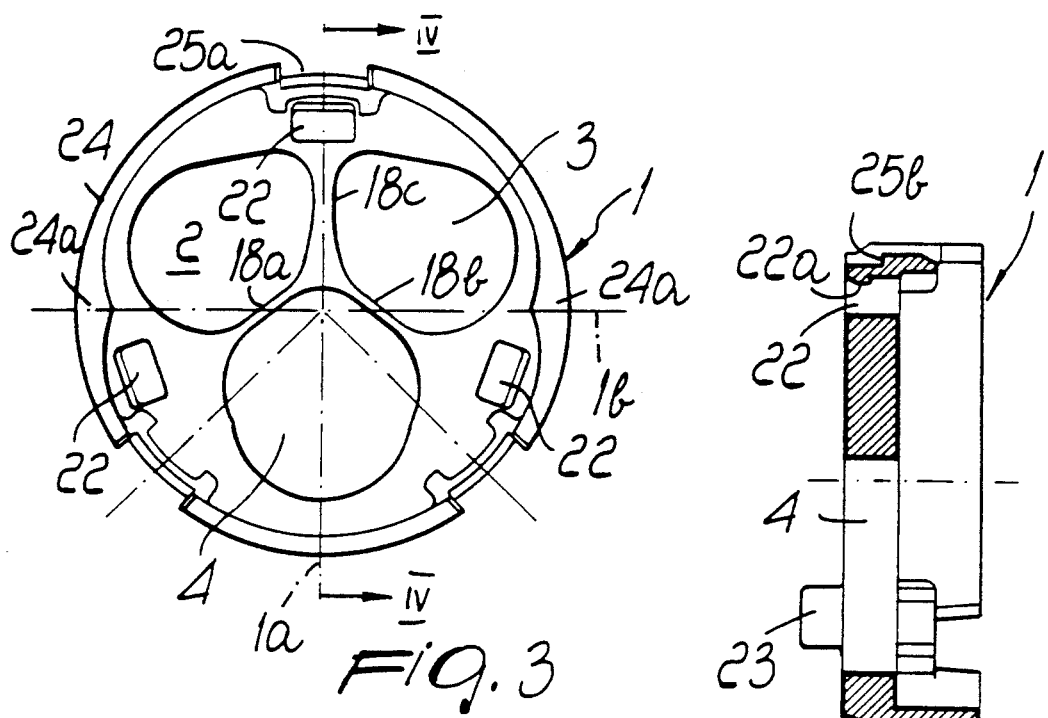
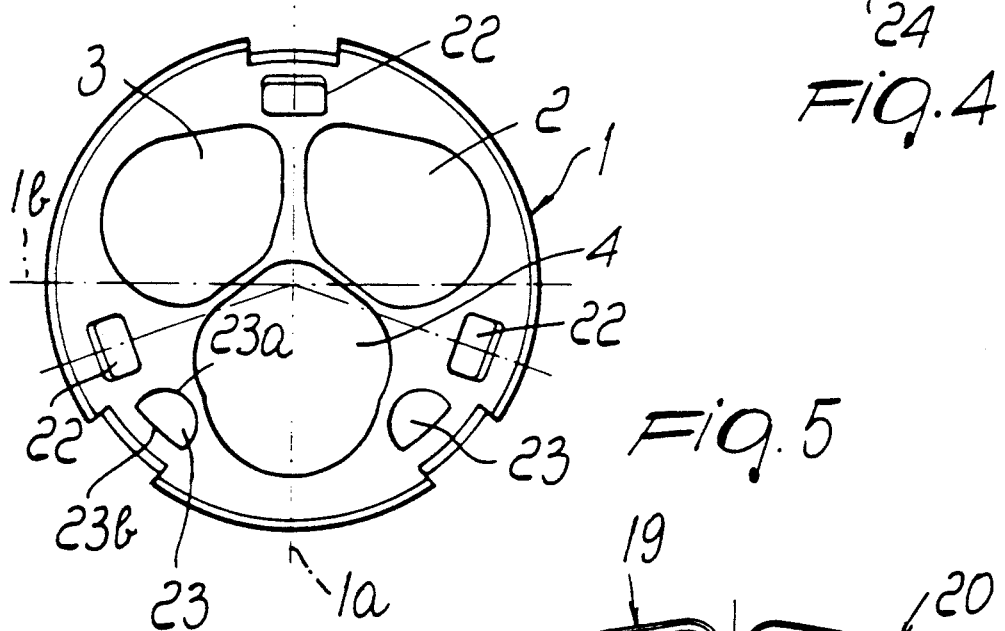
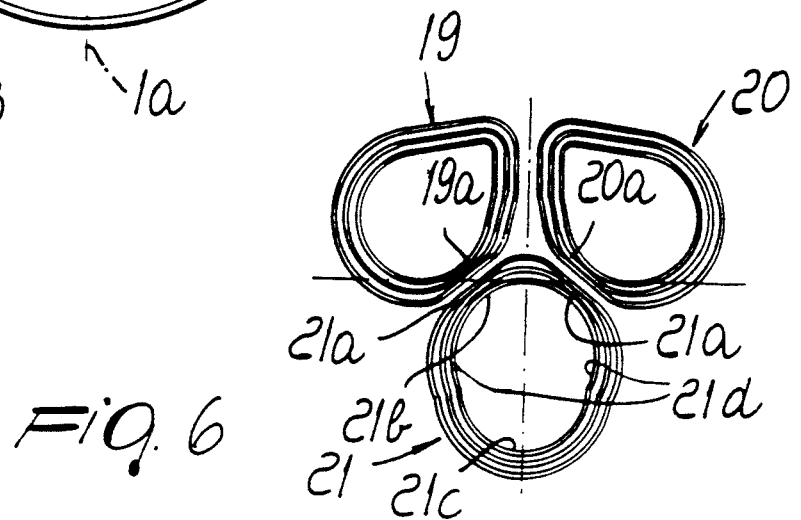

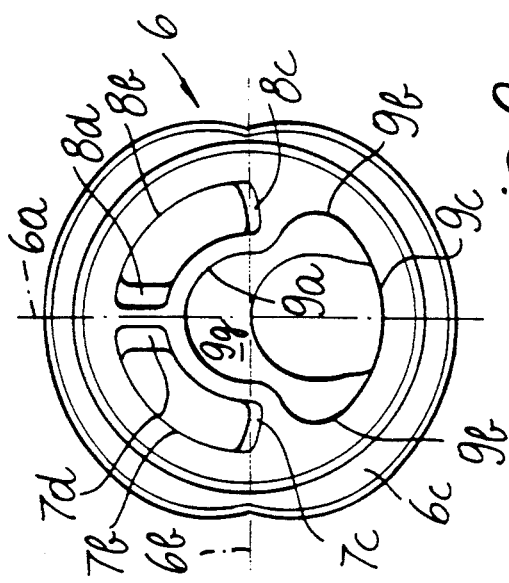
Fig.9
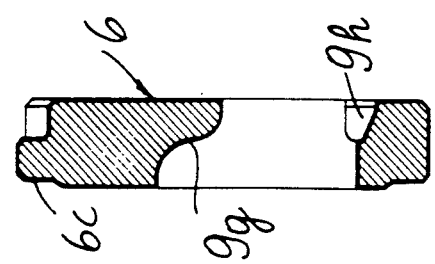
Fig.8
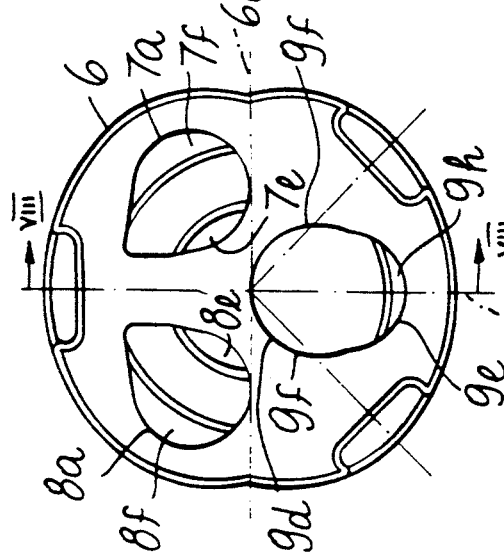
Fig.7
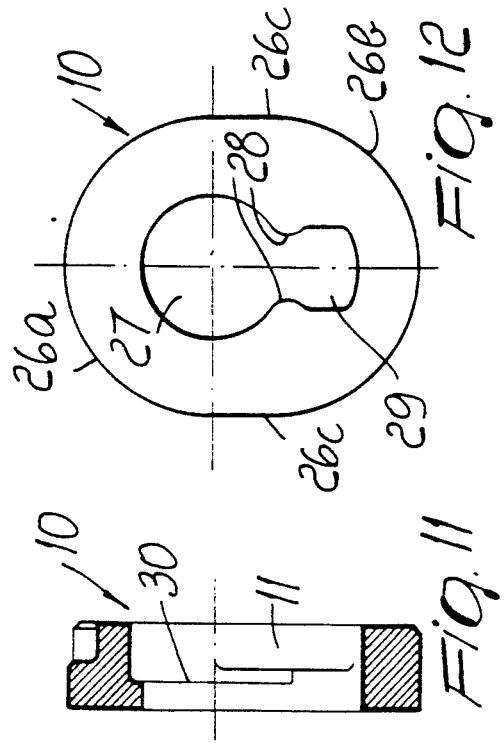
Fig.12
Fig.11
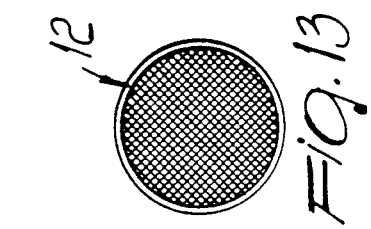
Fig.13
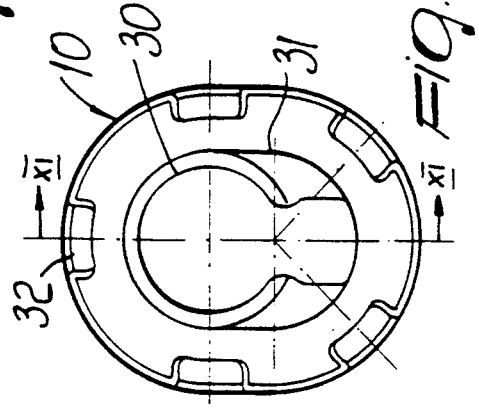
Fig.10

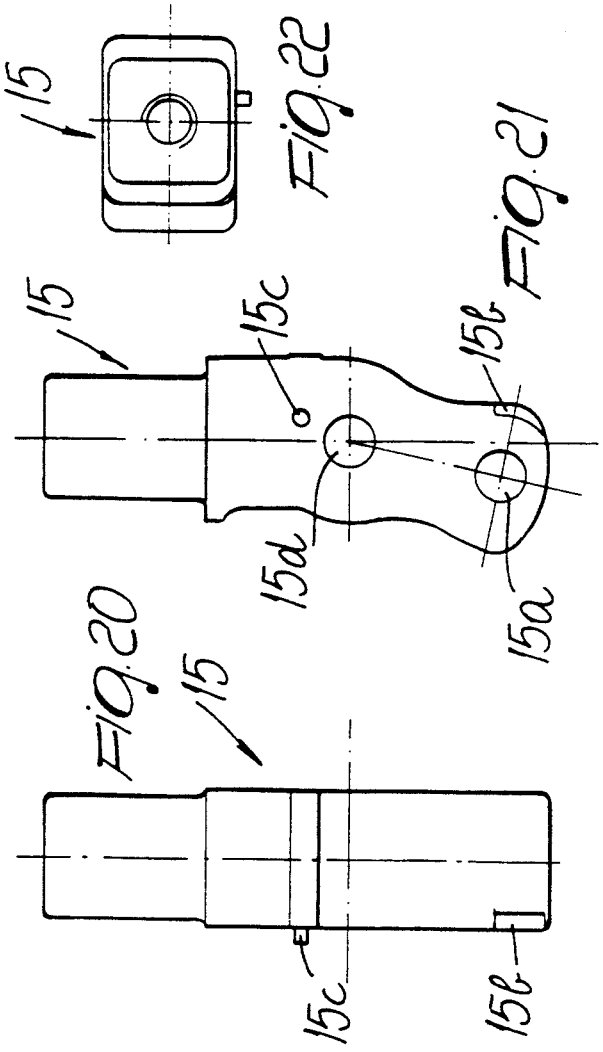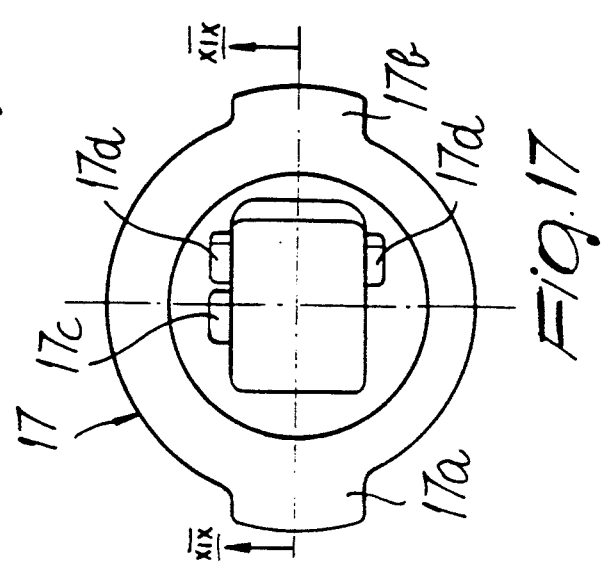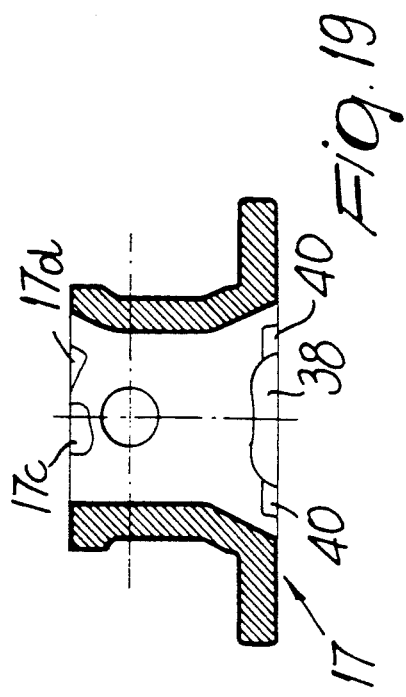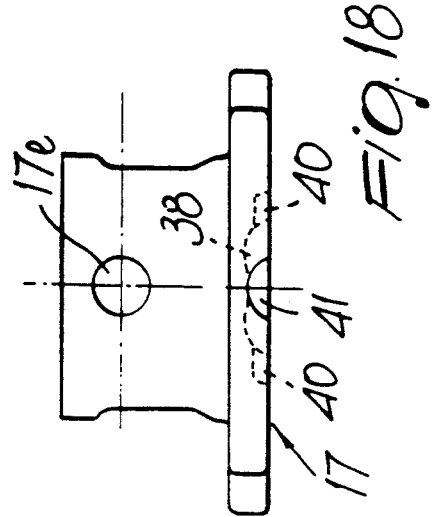

5,329,958

SINGLE-CONTROL MIXER CARTRIDGE FOR HOT AND COLD WATER

BACKGROUND OF THE INVENTION

The invention relates to a single-control mixer cartridge for hot and cold water.

As known, devices known as mixer cartridges are widely used in the field of faucets; these cartridges are inserted in the faucets and allow, by acting on a single actuation lever, to vary both the flow-rate delivered by the faucet from zero to a maximum value and the temperature of the delivered water by appropriately mixing the hot water and the cold water that arrive at said faucet.

These devices comprise a bottom provided with two inlet openings for the separate inflow of hot and cold water and with an outlet opening for hot, cold or mixed water, and a body which is associated with said bottom so as to define a portion of space suitable to contain a fixed plate, made of ceramic material and provided with holes corresponding to the openings of the bottom, and a movable plate, also made of ceramic material, which comprises a mixing chamber.

Said movable plate is coupled, with a plate covering element interposed or not, to the above mentioned actuation lever, which is pivoted on a rotating coupling inside said body; in this manner it is possible to make the movable plate assume different positions with respect to the fixed plate, thus obtaining different flow-rates and temperatures of the water delivered by the faucet, according to methods which are too well-known to delve into them.

Known cartridges have a bottom which, by virtue of the shape and arrangement of the openings, is excellently suited for inserting the cartridge in very simple faucets, such as ordinary flush-mount faucets for bathtubs and showers, whereas it is troublesome to insert said cartridge in different faucets, such as for example faucets for washbowls or bidets or for bathtub fittings.

So-called adapter devices have thus been proposed; they are inserted between the cartridge and the base of the cartridge accommodation cavity formed in the faucet; however, these adapter devices are not capable of meeting all the requirements of the various kinds of faucet, and most of all they create maintenance problems since, as they usually remain stuck in said cavity due to the hardening of the gaskets or to lime concretions, they cannot be removed and thus cleaned or replaced when necessary.

There are also cartridges in which the bottom is shaped so that it adapts in optimum conditions to individual types of faucet which are different from flush-mount ones for bathtubs and showers; however, obviously they do not allow interchangeability, since they are targeted for a single type of faucet, with all the consequent and well-known disadvantages.

It should also be noted that known cartridges, and particularly those meant to be inserted in small faucets, often have an inadequate performance as regards delivered water flow-rate and functionality, considered as ease in adjusting the temperature of the water and as ease in sliding during actuation.

SUMMARY OF THE INVENTION

The aim of the present invention is therefore to provide a single-control mixer cartridge for hot and cold water which overcomes the problems encountered in the use of the prior art mixer cartridges. Within this aim, an object of the invention is to provide a mixer cartridge which is intrinsically suited to be inserted in an optimum manner in ordinary faucets, such as flush-mount faucets for bathtubs and showers. Another object of the invention is to provide a mixer cartridge which can be converted for optimum insertion in different faucets.

A further object of the present invention is to provide a mixer cartridge having optimum performance characteristics from all points of view.

The proposed aim and the object mentioned are achieved by a single-control mixer cartridge for hot and cold water, according to the present invention, comprising: a substantially flat bottom, provided with openings for the separate inflow of hot and cold water and with an outflow opening for hot, cold or mixed water; a body associated with said bottom; a fixed plate superimposed on said bottom and provided with water flow openings corresponding to those provided in said bottom; and a movable plate provided with a plate cover, so as to internally define a mixing chamber, o and movable to assume different positions with respect to the fixed plate; said plate cover being coupled to an actuation lever pivoted on a coupling which is rotatable within said body; characterized in that the bottom is provided with means for the stable engagement of a supplemental bottom.

BRIEF DESCRIPTION OF THE DRAWINGS

Further characteristics and advantages of the present invention will become apparent from the description of a preferred but not exclusive embodiment of the invention, illustrated only by way of non-limitative example in the accompanying drawings, wherein:

FIG. 1 is a sectional view of the cartridge according to the present invention, taken along a diametrical plane;

FIG. 2 is an exploded view of the components of the cartridge according to the present invention;

FIG. 3 is a view of the bottom of the cartridge, taken from the side directed toward the inside of said cartridge;

FIG. 4 is a sectional view, taken along the plane IV—IV of FIG. 3;

FIG. 5 is a view of the bottom of the cartridge, taken from the side directed outwards;

FIG. 6 is a view of the gaskets located at the periphery of the water flow openings provided in the bottom;

FIG. 7 is a view of the fixed plate, taken from the side directed toward the bottom;

FIG. 8 is a sectional view, taken along the plane VIII—VIII of FIG. 7;

FIG. 9 is a view of the fixed plate, taken from the side directed toward the movable plate;

FIG. 10 is a view of the movable plate, taken from the side directed toward the plate cover;

FIG. 11 is a sectional view, taken along the plane XI—XI of FIG. 10;

FIG. 12 is a view of the movable plate, taken from the side directed toward the fixed plate;

FIG. 13 is a view of the noise screen inserted within the movable plate;

FIG. 17 is a plan view of the coupling;

FIG. 18 is a side view of the coupling;

FIG. 19 is a sectional view, taken along the plane XIX—XIX of FIG. 17;

FIGS. 20, 21 and 22 are views of the lever taken along three orthogonal planes;

DESCRIPTION OF THE PREFERRED EMBODIMENTS

Figure 16:
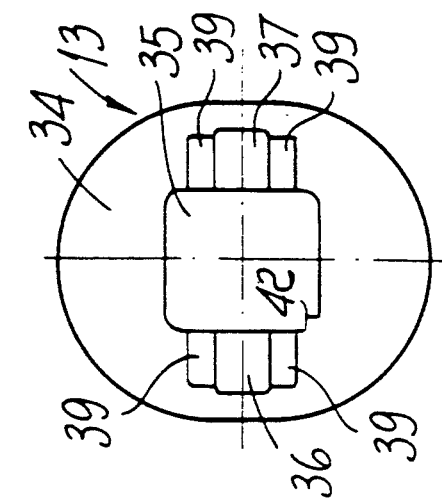
FIG. 16 is a view of the plate cover, taken from the side directed toward the coupling.
Figure 15:
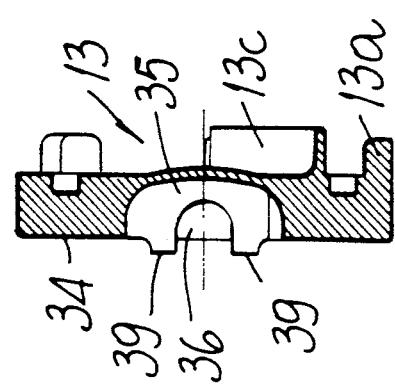
FIG. 15 is a sectional view, taken along the plane XV—XV of FIG. 14.
Figure 14:
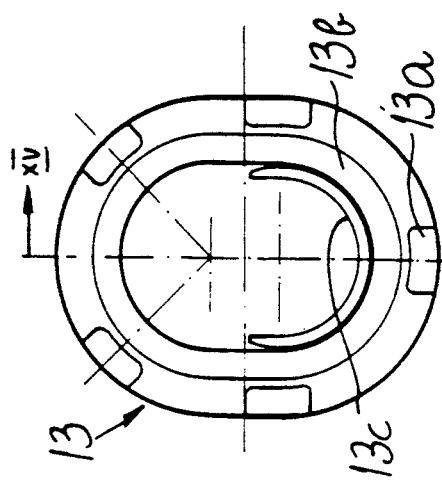
FIG. 14 is a view of the plate cover, taken from the side directed toward the movable plate.
Figure 24:
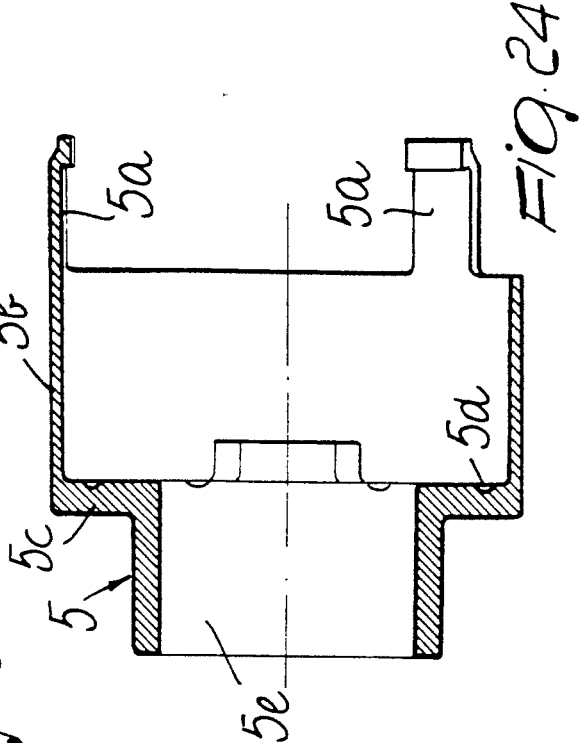
FIG. 24 is a sectional view, taken along the plane XXIV—XXIV of FIG. 23.
Figure 23:
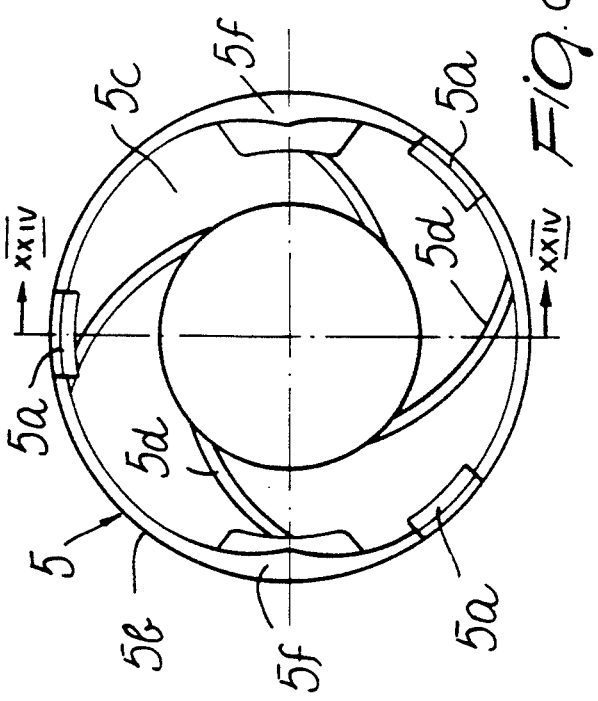
FIG. 23 is a view of the body, taken from the side directed toward the inside of the cartridge.

With reference to the above FIGS. 1 and 2, the cartridge according to the present invention comprises: a substantially flat bottom 1, provided with openings for the separate inflow of hot water 2 and cold water 3, and with an opening 4 for the outflow of hot, cold or mixed water; a body 5, associated with the bottom 1; a fixed plate 6, provided with inflow openings 7 and 8 for hot and cold water respectively, and with an outflow opening 9 for hot, cold or mixed water; a movable plate 10, internally comprising a mixing chamber 11 and a noise screen 12; a plate cover 13 removably rigidly coupled to the movable plate 10 and coupled, by virtue of the pin 14, to the actuation lever 15, which is pivoted at 16 on the coupling 17 which is rotatable within the body 5.

By moving the lever 15 about the fulcrum 16, the movable plate 10 moves with respect to the fixed plate 6; this movement, as is known, varies from zero to a maximum value the flow-rate of water delivered by the faucet in which the cartridge is inserted.

By rotating the coupling 17 between two extreme positions which are mutually spaced by an angle termed "mixing angle", the temperature of the water delivered by the faucet varies from the minimum temperature, which coincides with the inflow temperature of the cold water, to the maximum temperature, which coincides with the temperature of the hot water.

It is now possible to separately examine the individual components, starting from the bottom 1, with reference to FIGS. 3, 4, 5 and 6.

As mentioned, the bottom 1 comprises the openings 2 and 3, respectively for the inflow of hot and cold water, and the opening 4 for the outflow of hot, cold or mixed water, depending on the position of the movable plate 10 with respect to the fixed plate 6; said opening 4 is symmetrical with respect to the axis 1a and is almost entirely contained on one side of the axis 1b; the openings 2 and 3 are also symmetrical with respect to the axis 1a, and are almost entirely located on the other side of the axis 1b.

Said openings are advantageously mutually separated by thin walls 18a, 18b and 18c having a substantially uniform thickness, so as to exploit the available area as much as possible.

The inflow openings 2 and 3 are provided respectively with the through gaskets 19 and 20, which provide maximum functional assurances and, again with the purpose of maximally exploiting the area available for water flow, are thinner in the regions 19a, 20a in which they are adjacent to the gasket 21 of the outflow opening 4, also characterized by a thinner portion in the regions 21a.

It should be furthermore noted that the internal perimeter of the gasket 21 is shaped like two oppositely arranged circular arcs 21b and 21c, each of which extends half on one side and half on the other side with respect to the axis of symmetry, and which are linked by means of the two circular arcs 21d; 21d. Furthermore, the perimeter of the internal wall of the gasket 21 of the outflow hole 4 for hot, cold or mixed water is shaped so as to define consecutive circular portions in which at least the different centers are aligned along the axis of symmetry 1a. This configuration this allows the bottom according to the present invention to be correctly associated with most of the types of holes provided in currently commercially available faucets.

The cartridge according to the present invention, with the bottom described above, is perfectly suited to be inserted in certain types of faucet, such as flush-mount faucets for bathtubs and showers, but it is provided with means for connection to a supplemental bottom to allow optimum conditions of insertion in different faucets; said means comprise the three slots 22, which pass through the thickness of the bottom, are provided with a tooth 22a and are suitable to stably associate, with a snap-together action, with protrusions which are rigidly coupled to the supplemental bottom.

Once said protrusions have been associated with said slots, they can be separated only by using an appropriate tool, whereas the connection is assuredly fixed when the cartridge is extracted from its seat in the faucet for maintenance or replacement.

The reference numeral 23 furthermore designates two reference pins suitable to enter circular holes provided at the base of the cavity for accommodating the cartridge in a faucet; in order to be also associable with holes provided in a supplemental bottom, if provided, said pins are shaped to define a cylindrical portion 23a whose diameter is equal to that of said circular holes, conveniently reduced in its outward bulk by the wall 23b.

The bottom 1 is provided with a wall portion 24 containing the fixed plate 6 and having recessed regions, such as 25a, in which teeth such as 25b are defined; said teeth allow to stably associate the body 5 with said bottom 1 by snap-together engagement of the teeth which are located at the ends of the legs 5a of said body.

The body 5 comprises a first substantially cylindrical portion 5b suitable to be arranged directly after the wall portion 24 of the bottom and connected, by means of the flat annular portion 5c provided with helical grooves 5d for containing lubricating grease, to the second cylindrical portion 5e, for containing and guiding the coupling 17 in its movement.

Figure 31:
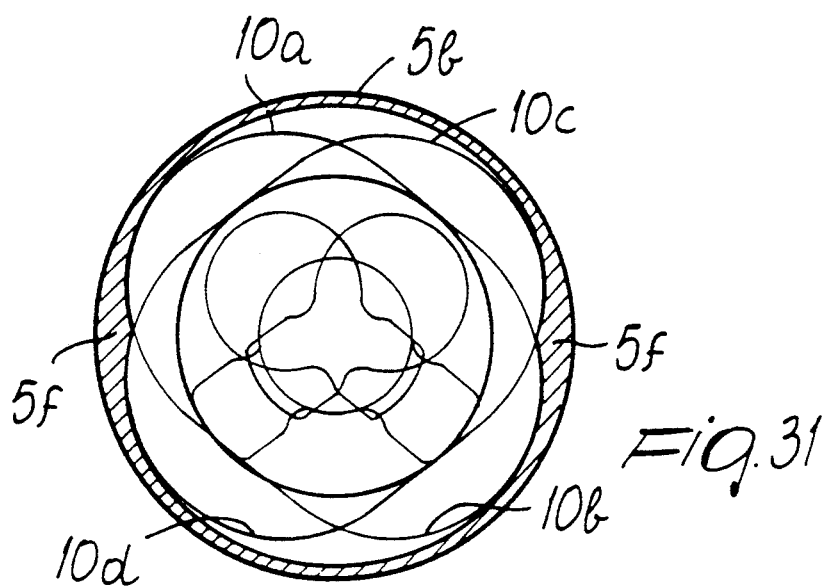
FIG. 31 is a schematic view of different positions of the movable plate in its movement within the body of the cartridge.

Said cylindrical portion 5b is internally provided with strengthening ridges 5f in regions which, by virtue of the particular shape of the movable plate 10, are not involved in the movement of said plate; this circumstance is highlighted by FIG. 31, which shows, in 10a, 10b, 10c and 10d, the four extreme positions of the movement of the plate 10.

The wall 24 of the bottom 1 is also provided with similar ridges 24a.

The fixed plate 6 is now described in detail.

As mentioned above with reference to FIG. 2, the fixed plate 6 comprises the two inflow openings 7 and 8, respectively for hot and cold water, which are arranged symmetrically with respect to the diametrical axis 6a, and the outflow opening 9 for hot, cold or mixed water, which is symmetrical with respect to said axis 6a.

Starting by considering the inflow openings, it can be seen that on the surface directed toward the bottom 1, visible in FIG. 7, they have sections 7a, 8a, which are shaped like a drop which is elongated toward the axis of symmetry 6a, and that on the surface directed toward the movable plate 10, visible in FIG. 9, they have sections 7b, 8b which are shaped so as to form a circular arc which is concentric with respect to the wall of the plate.

Two walls 7c and 7d, which are flared toward the section 7b, and two walls 7e and 7f, which are flared toward the section 7a, extend from said section 7a toward said section 7b so as to define the opening 7; similarly, two walls 8c and 8d, which are flared toward the section 8b, and two walls 8e and 8f, which are flared toward the section 8a, extend from said section 8a toward said section 8b, so as to form the opening 8.

An optimum shape of the inflow openings 7 and 8 is thus produced; the drop-shaped section 7a, 8a for water inflow, which has determined the shape of the inflow openings 2 and 3 in the bottom 1, with the related gaskets 19 and 20, is the most suitable to act as intermediate section in the path of the water entering the cartridge toward the movable plate 10, between the two extreme sections which, it is stressed, are the circular outflow section at the base of the seat of the cartridge in the faucet and the arc-like section 7b, 8b; the flared walls of said openings define a fluid path with optimum fluid-dynamic conditions.

The outflow opening 9 is now considered in order to observe that its section on the surface directed toward the movable plate, shown in FIG. 9, is shaped so as to define a portion 9a which is comprised within the inflow openings, with an edge which is concentric with respect to said openings, and expands in 9b at right angles to the axis of symmetry 6a in the region not affected by the inflow openings in a portion which is closed by the arc 9c, which is concentric with respect to the periphery of the plate and has a diameter equal to that of the outer edge of the arc-like openings 7b and 8b; a section is thus defined which maximally facilitates the flow of water, thus avoiding any throttling thereof, and indeed offering large passage sections, as better described hereinafter.

Continuing with the description of the outflow opening 9, it can be seen that its section on the surface of the plate which is directed toward the bottom, shown in FIG. 7, is shaped so as to form two oppositely arranged circular arcs 9d and 9e which are linked by the circular arcs 9f; in this respect, it follows the shape of the gasket 21 for the purpose specified earlier. The section of the outflow opening 9 in the surface directed toward the bottom is shaped so as to define consecutive circular portions having at least different centers aligned along the axis of symmetry.

The surface 9g, which is substantially flared toward the above described section, shown in FIG. 7, and a small section portion 9h, having an opposite shape, extend from said section towards the section illustrated in FIG. 9; this provision is aimed at optimizing fluid-dynamic conditions.

Before ending the description of the fixed plate 6, it should be noted that the inflow sections 7a, 8a and the outflow section shown in FIG. 7 are tangent, on opposite sides, with respect to the diametrical axis 6b which is at right angles to the axis of symmetry 6a; finally, one should also consider the presence of the recessed peripheral region 6c, which improves the conditions of the movement of the movable plate 10 in contact with the fixed plate 6; said region 6c is internally delimited by a circumference which is concentric to the external wall of the plate which encloses the sealing region.

The movable plate 10 is now described, having an elongated shape, and the edge whereof is shaped so as to define the two half-circles 26a, 26b which are linked by means of the two straight portions 26c.

Figure 25:
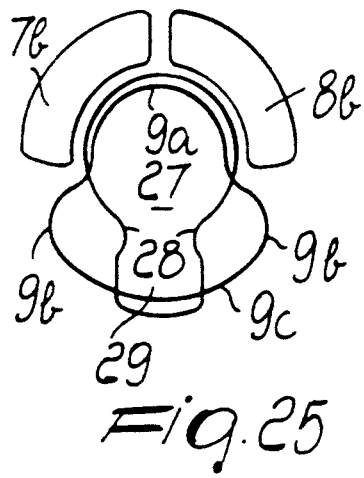
FIGS. 25, 26, 27, 28, 29 and 30 are views of different relative positions of the water flow openings provided in the fixed and movable plates.

On the surface shown in FIG. 12, meant to be directed toward the fixed plate 6, said movable plate 10 has a water flow opening connected to the mixing chamber 11 and shaped so as to define a first portion 27, whose circular edge has a diameter which is intermediate between the diameter of the internal edge of the sections 7b and 8b and the diameter of the section portion 9a, as can be seen from FIG. 25; a second portion 29 extends from said portion 27, is linked by means of the two protrusions 28, is symmetrical with respect to the axis of symmetry of the plate and is closed by an arc.

The mixing chamber 11 defined within the plate 10 is provided with the resting abutment 30 for the noise screen 12, which is constituted by the circular portion of metallic mesh with folded edge which can be seen in FIG. 13; above the level of said abutment, said mixing chamber 11 is shaped so as to define a side wall 31 which follows the shape of the outer lateral wall of the plate.

The reference numeral 32 furthermore designates one of the seats for the feet with which the plate cover 13, described hereinafter, is provided; said plate cover delimits the mixing chamber 11 in an upward region.

A few brief notes on operation, given with reference to FIGS. 25 to 30, in which the water flow regions are indicated by stippling, shall suffice to highlight some of the main characteristics of the invention, the general operation of said invention being well-known.

In the position of FIG. 25, which is obtained by placing the coupling 17 supporting the movable plate actuation lever 15 at the center and by placing said lever o at one end of its stroke about the fulcrum 16, no water flows; the circular edge of the portion 27 of the section of the movable plate is superimposed on the safety region comprised between the inflow sections 7b and 8b and the portion 9a of the outflow section, all of which are provided in the fixed plate.

Figure 26:
Figure 27:

Without rotating the coupling 17, the lever 15 is moved and, by passing through the position of FIG. 26, in which medium flow-rate and mixing with equal flows of hot water entered from 7b and of water entered from 8b occur, one reaches the position of FIG. 27, with the maximum flow-rate and with equal flows of hot and cold water; here the importance of the portion 29 of the section of the movable plate in conveying water to the outflow opening is evident.

Figure 28:
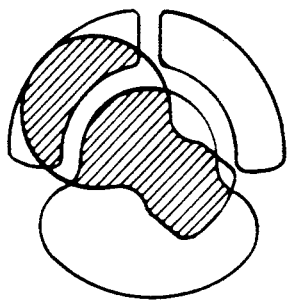
Figure 29:
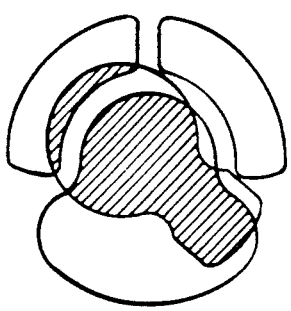

By turning the coupling 17 until it reaches the stroke limit on the hot water side, the position of FIG. 28 is obtained; this position indeed conveys only hot water with the maximum flow-rate, and said flow-rate can be decreased by moving, as a consequence of the movement of the lever 15 about the fulcrum 16, into the position of FIG. 29, which shows the importance, in terms of water conveyance, of the presence of the portion 9b of the outflow section in the fixed plate combined with the portion 29 of the opening of the movable plate.

Figure 30:
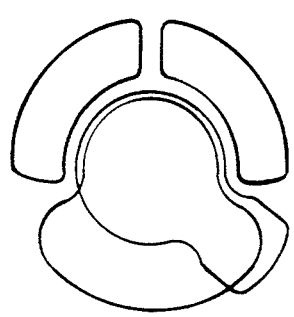

By continuing the movement of the lever 15 until it reaches the stroke limit, one reaches the closure position of FIG. 30, showing the importance of the protrusions 28, which allow to obtain a high mixing angle highly appreciated by users since it allows easy and fine temperature adjustment without having to reduce the dimensions of the sections 7b and 8b, while maintaining an adequate safety region for sealing.

The plate cover 13, the actuation lever 15 and the coupling 17 are now described; it is immediately evident that said plate cover 13 has, on the side directed toward the movable plate 10: the five feet, such as 13a, for association with said plate; the recess 13b for the gasket 33 shown in FIG. 1; and the protrusion 13c, meant to make contact with the noise screen 12, which rests on the abutment 30 of said movable plate.

On the side directed toward the coupling 17, the plate cover 13 is instead provided with the flat surface 34, which makes contact with said coupling; said flat surface is provided with the cavity 35 for accommodating the end of the lever 15 which protrudes from said coupling.

The seats 36 and 37 of the traction pin 14, rigidly coupled to the lever 15 in the hole 15a, are present at the edges of the cavity 35; since said pin 14 is partially located within the recesses 38 provided at the base of the coupling 17, said seats have protrusions 39 which extend from the flat surface 34 to enter recesses 40 which are also provided at the base of the coupling.

The reference numeral 41 furthermore designates a recess which is provided at the base of the coupling 17 and allows the insertion of the pin 14 in the hole 15a of the lever 15; said lever 15 is already located in said coupling, and said insertion can consequently occur for example in a single operation together with the fulcrum 16.

It should be stressed that all of the above described provisions are aimed at containing the axial size of the cartridge.

Again with reference to the plate cover 13, it should be noted that within the cavity 35 there is the protrusion 42, which is associable with the recess 15b in order to ensure the correct mutual assembly of the lever 15 and of the plate cover 13. To complete the description of the coupling 17, the reference numerals 17a and 17b designate two per se known protrusions constituting stroke limiting elements; the reference numeral 17c designates a seat for the pin 15c extending from the lever 15 proximate to the hole 15d for accommodating the fulcrum 16 and ensuring the correct assembly of the lever with the coupling; the reference numeral 17d designates the seats for a device for limiting the flow-rate delivered by the faucet, which is disclosed in Italian patent application No. MN92A000011 filed on Apr. 30, 1992 by the same Applicant; and finally the reference numeral 17e designates the hole for accommodating the fulcrum 16 of the lever 15.

From all of the above it can be immediately understood that the present invention provides a mixer cartridge which is intrinsically insertable in an optimum manner in certain types of very simple faucets, such as flush-mount faucets for bathtubs and showers, and can be easily converted, by virtue of the stable engagement of a supplemental bottom, for optimum insertion in faucets of a different kind.

This leads to absolute interchangeability, since only one type of cartridge is provided together with a plurality of supplemental bottoms suited for the various requirements, with easily imaginable advantages in terms of supply on the part of distribution organizations.

In the cartridge according to the present invention, optimum utilization of the areas available for the flow of water allows to obtain great flow-rates even in the small sizes imposed by the dimensions of the spaces for accommodating the cartridge in the faucets destined to accommodate it.

One should also note the optimization achieved as regards the functional characteristics, with the achievement of a high mixing angle, reliability concerning the seals, easy sliding movements, and optimum fluid-dynamic characteristics.

The described invention is susceptible to numerous modifications and variations, all of which are within the scope of the inventive concept; thus, for example, the means for stably coupling a supplemental bottom which are provided in the bottom of the cartridge may assume a different configuration with respect to the one described, and in particular the openings 22 may be present in any number; the internal profile of the gasket 21 may also be different from the one described by consisting of the combination of any number of circular arcs.

In the practical embodiment of the invention, all the details may be replaced with other technically equivalent elements.

I claim:

1. Single-control mixer cartridge for hot and cold water, comprising: a substantially flat bottom, provided with openings for the separate inflow of hot and cold water and with an outflow opening for hot, cold or mixed water; a body associated with said bottom; a fixed plate superimposed on said bottom and provided with water flow openings corresponding to those provided in said bottom; and a movable plate provided with a plate cover, so as to internally define a mixing chamber, and movable to assume different positions with respect to the fixed plate; said plate cover being coupled to an actuation lever pivoted on a coupling rotatable within said body; characterized in that the bottom is provided with means for the stable engagement of a supplemental bottom,
wherein said means for the stable engagement of a supplemental bottom comprise a plurality of slots passing through the thickness of the bottom and provided with a tooth in an intermediate region of said thickness.

2. Cartridge according to claim 1, wherein each slot has a substantially quadrilateral shape from which the tooth present in the intermediate region of the thickness extends.

3. Mixer cartridge, comprising a body associated with a bottom for containing a fixed plate and a movable plate provided with a plate cover which is coupled to an actuation lever pivoted on a rotating coupling, wherein said bottom comprises: an outflow opening for hot, cold or mixed water, which is symmetrical with respect to a diametrical axis of symmetry and is comprised, except for a small portion, on one side of the diametrical axis which is perpendicular to said axis of symmetry; and two inflow openings, respectively for hot and cold water, which are located, except for a small portion, on the opposite side of said diametrical axis and are symmetrical with respect to said axis of symmetry, separated from each other and from the outflow opening by means of thin walls having a substantially uniform thickness, wherein the openings provided in the bottom are fitted with through gaskets which are thinner in the regions where the outflow opening is adjacent to the inflow openings.

4. Cartridge according to claim 3, wherein the perimeter of the internal wall of the gasket of the outflow opening for hot, cold or mixed water is shaped so as to define consecutive circular portions in which at least the different centers are aligned along the axis of symmetry.

5. Cartridge according to claim 4, wherein the perimeter of the internal wall of the gasket of the outflow opening is shaped so as to define two oppositely arranged circular arcs, each of which extends half on one side and half on the other side with respect to the axis of symmetry, said arcs being linked by means of two circular arcs.

6. Cartridge according to claim 3, wherein the bottom comprises reference pins suitable to enter at least holes provided at a base of a cavity for accommodating the cartridge in a faucet, said pins being shaped so as to define a cylindrical portion in which the diameter is equal to the diameter of said holes, another portion being conveniently reduced in its outward dimension.

7. Mixer cartridge, comprising a body associated with a bottom for containing a fixed plate and a movable plate provided with a plate cover which is coupled to an actuation lever pivoted on a rotating coupling, wherein said body comprises a first substantially cylindrical portion provided with legs for stable snaptogether engagement with said bottom, said first portion being connected by means of a flat annular region to a second cylindrical portion for containing the rotating coupling and guide it in its movement, said bottom comprising a wall portion containing the fixed plate and is arranged so as to continue the wall of said first cylindrical portion of the body, wherein the flat annular region is provided, on its face directed toward the inside of the cartridge, with helical grooves suitable to contain lubricating substances.

8. Cartridge according to claim 7, wherein an internal surface of the first cylindrical portion of the body has two oppositely arranged strengthening ridges in regions not involved in the movement of the movable plate, said ridges being also present in the wall portion comprised within the bottom.

9. Mixer cartridge, comprising a body associated with a bottom for containing a fixed plate and a movable plate provided with a plate cover which is coupled to an actuation lever pivoted on a rotating coupling, said fixed plate comprising: an opening for the outflow of hot, cold, or mixed water, which is symmetrical with respect to a diametrical axis of symmetry; and two inflow openings, respectively for hot and cold water, which are symmetrical with respect to said axis; wherein a section of each inflow opening on a surface directed toward the bottom is shaped like a drop which is elongated toward the axis of symmetry, and in that a section on a surface directed toward the movable plate is shaped so as to define a circular arc concentric with the plate; in that two walls extend from the section on the surface which is directed toward the bottom and are flared toward the section on the surface directed toward the movable plate at extreme edges of said section on the surface directed toward the movable plate; and in that two walls with an opposite shape extend from said section on said surface directed toward the bottom at the edges of said section shaped like circular arcs.

10. Cartridge according to claim 9, wherein a section of the outflow opening on the surface which is directed toward the movable plate is shaped so as to define a portion which is comprised within the inflow openings with an edge which is concentric with respect to said inflow openings and expands at right angles to the axis of symmetry in the region not affected by said inflow openings in a portion which is closed by a circular arc which is concentric to the periphery of the plate and has the same diameter as the outer edge of the inflow openings, whereas the section of said outflow opening on the surface directed toward the bottom is shaped so as to define consecutive circular portions having at least different centers aligned along the axis of symmetry; in that walls extend from the section on the surface which is directed toward the bottom and are substantially flared toward the section on the surface directed toward the movable plate, except for a portion of wall having the opposite shape in the region proximate to the periphery of the plate.

11. Cartridge according to claim 10, wherein the section of the outflow opening on the surface directed toward the bottom is shaped so as to define two opposite circular arcs, each of which extends half on one side and half on the other side with respect to the axis of symmetry, said arcs being linked by means of two circular arcs.

12. Cartridge according to claim 10, wherein the sections of the two inflow openings and the section of the outflow opening on the surface directed toward the bottom are tangent, on opposite sides, with respect to the diametrical axis which is perpendicular to the axis of symmetry.

13. Cartridge according to claim 9, further comprising, at the surface directed toward the movable plate, a recessed peripheral region which is internally delimited by a circle which is concentric with respect to the external wall of the plate.

14. Cartridge according to claim 9, wherein the movable plate has, on its surface directed toward the fixed plate, a water flow opening connected to the mixing chamber defined within said plate, which is shaped so as to define a first portion having a circular edge whose diameter is intermediate between the diameter of the internal edge of the section of the inflow openings present on the surface of the fixed plate which is directed toward the movable plate and the diameter of the portion of the section of the outflow opening which is comprised within said inflow openings; and in that a second portion extends from said first portion, is connected thereto by means of two protrusions and is symmetrical with respect to the axis of symmetry of the plate; said plate having an elongated shape whose edge defines two half-circles linked by straight portions.

15. Cartridge according to claim 14, wherein the mixing chamber defined within the movable plate has, at the first portion of the water flow opening, a resting abutment for a noise screen meant to be kept in position by a protrusion extending from the overlying plate cover, said screen being constituted by a circular portion of flat mesh with folded edges, said mixing chamber having, from the level of said noise screen up to the surface of the plate which is directed toward the plate cover, a lateral wall which follows the shape of the lateral outer wall of the plate.

16. Mixer cartridge, comprising a body associated with a bottom for containing a fixed plate and a movable plate provided with a plate cover coupled to an actuation lever which is pivoted on a rotating coupling, said lever being provided with a traction pin for pulling said plate cover, wherein the plate cover has a flat surface suitable to make contact with said coupling, said surface being provided with a cavity for accommodating the end of the lever protruding from said coupling; and in that seats for the traction pin are provided at the edges of said cavity and, said pin is partially located within recesses present at a base of the coupling, said seats have protrusions extending from said flat surface to enter said recesses.

17. Cartridge according to claim 16, further comprising a recess at the base of the coupling, which is suitable to allow the insertion of the pin of the plate cover in the lever arranged in said coupling.

18. Cartridge according to claim 16, wherein the lever has, proximate to its end, a recess suitable to associate with a protrusion which is present in the cavity accommodating said end which is present in the plate cover, so as to ensure the correct mutual assembly of the lever and the plate cover.

19. Single-control mixer cartridge for hot and cold water, comprising:
 a substantially flat bottom provided with openings for separate inflow of hot and cold water and an outflow opening for hot, cold or mixed water;
 a body associated with said bottom;
 a fixed plate superimposed on said bottom and provided with water flow openings corresponding to said openings for separate inflow of hot and cold water and said outflow opening;
 a movable plate which is movable to assume different positions with respect to said fixed plate;
 a plate cover superimposed on said movable plate;
 a mixing chamber delimited by said movable plate and said plate cover;
 an actuation lever coupled to said plate cover and pivoted on a coupling, said coupling being rotatable within said body, and;
 means for stable engagement of a supplemental bottom provided on said bottom;
 wherein said means for stable engagement of a supplemental bottom comprise at least three points of anchorage.

20. Single-control mixer cartridge according to claim 19, wherein said at least three points of anchorage comprise three slots, and wherein said substantially flat bottom defines a thickness, said three slots passing through said thickness of said bottom and each being provided with a tooth at an intermediate region of said thickness.

21. Mixer cartridge comprising:
 a bottom defining a diametrical axis of symmetry and a second diametrical axis, said second diametrical axis being perpendicular to said first diametrical axis of symmetry;
 an outflow opening for hot, cold or mixed water formed in said bottom, said outflow opening being symmetrical with respect to said diametrical axis of symmetry and being located, except for a small portion thereof, at one side of said second diametrical axis;
 two inflow openings for hot and cold water formed in said bottom, said inflow openings being symmetrical with respect to said diametrical axis of symmetry and located, except for a small portion thereof, at an opposite side of said second diametrical axis with respect to said outflow opening;
 a body connected to said bottom;
 a fixed plate contained within said body;
 a movable plate located on said fixed plate;
 a plate cover connected to said movable plate;
 an actuation lever pivotally connected to a rotatable coupling and coupled to said plate cover, and;
 at least three thin walls separating said two inflow openings from each other and separating said outflow opening from said inflow openings, said thin walls each having a length, and a substantially uniform thickness throughout said length.

22. Mixer cartridge, comprising:
 a body;
 a bottom connected to said body;
 a fixed plate and a movable plate contained within said body;
 a plate cover connected to said movable plate;
 a rotating coupling;
 an actuation lever pivoted on said rotating coupling and connected to said plate cover;
 wherein said body comprises;
 a first substantially cylindrical portion defining a wall;
 legs extending from said first substantially cylindrical portion for stable snap-together engagement with said bottom,
 a second substantially cylindrical portion containing said rotating coupling and guiding movement thereof;
 a flat annular region connecting said first cylindrical portion to said second cylindrical portion, and;
 wherein said bottom comprises a wall portion containing said fixed plate and defining a flush, uninterrupted, linear continuation of said wall of said first cylindrical portion of said body.

23. Mixer cartridge according to claim 22, wherein said bottom defines a bottom diameter, and wherein said first cylindrical portion of said body defines a diameter corresponding to said bottom diameter.

* * * * *